United States Patent [19]
Lee

[11] Patent Number: 5,927,463
[45] Date of Patent: Jul. 27, 1999

[54] VERTICAL MACHINING CENTER WITH A VERTICAL PALLET CAPABLE OF CLAMPING A HORIZONTAL PALLET THEREON

[75] Inventor: Joong Kwoen Lee, Changwon, Rep. of Korea

[73] Assignee: Daewoo Heavy Industries Ltd., Incheon, Rep. of Korea

[21] Appl. No.: 08/771,760

[22] Filed: Dec. 20, 1996

[30] Foreign Application Priority Data

Dec. 23, 1995 [KR] Rep. of Korea ............ 95-55636

[51] Int. Cl.$^6$ .................................. B65G 37/00
[52] U.S. Cl. ......................... 198/346.1; 198/345.1
[58] Field of Search ................ 198/345.1, 345.2, 198/346.1, 346.2, 346.3

[56] References Cited

U.S. PATENT DOCUMENTS

| | | | |
|---|---|---|---|
| 4,679,286 | 7/1987 | Momoi et al. | 198/346.1 X |
| 5,052,540 | 10/1991 | Matsuyama et al. | 198/346.1 |
| 5,099,981 | 3/1992 | Guzzoni | 198/346.2 X |
| 5,160,011 | 11/1992 | Yoshiji et al. | 198/346.1 X |
| 5,259,494 | 11/1993 | Hirose | 198/346.1 X |

FOREIGN PATENT DOCUMENTS

| | | | |
|---|---|---|---|
| 3734683 | 4/1988 | Germany | 198/346.2 |
| 3921532 | 1/1991 | Germany | 198/346.3 |

*Primary Examiner*—James R. Bidwell
*Attorney, Agent, or Firm*—Staas & Halsey

[57] ABSTRACT

A vertical machining center is usable in combination with a horizontal machining center in a flexible manufacturing system with no incompatibility of their pallets. This should be attributable to the provision of a vertical pallet designed to clamp a horizontal pallet thereon. The vertical pallet includes, inter alia, a pallet base with a cylinder recess, a pallet saddle provided above the pallet base and removably holding the horizontal pallet therealong, the pallet saddle movable between an up position wherein the horizontal pallet remains unclamped and a down position wherein the horizontal pallet is clamped against the pallet base, and an actuator for causing the pallet saddle to move between the up position and the down position.

12 Claims, 6 Drawing Sheets

VERTICAL MACHINING CENTER WITH A VERTICAL PALLET CAPABLE OF CLAMPING A HORIZONTAL PALLET THEREON

FIELD OF THE INVENTION

The present invention relates generally to a vertical machining center utilized in combination with a horizontal machining center and/or a numerically controlled lathe in a flexible manufacturing system to machine workpieces into final products of desired shape. More specifically, the invention is concerned with a vertical pallet for use in the vertical machining center of the type capable of clamping thereon a horizontal pallet transferred from the horizontal machining center and/or the numerically controlled lathe.

DESCRIPTION OF THE PRIOR ART

Flexible manufacturing systems have been used, inter alia, in cutting metal workpieces into a product of desired size and configuration. Exemplary components of such flexible manufacturing systems include a plurality of machining centers and, optionally, a numerically controlled lathe, both of which would directly involve in the cutting process of workpieces. The workpieces are clamped on pallets in a set-up station and then transferred to each of the machining centers and the numerically controlled lathe. The transportation of the pallets, whether empty or loaded, may be made by means of a stacker crane which would shuttle from a pallet stacker to the set-up station, the machining centers and the numerically controlled lathe under the control of a system controller. In addition to the above, the flexible manufacturing systems may further include a chip removal station, a workpiece cleaning station and a tool stacker, all of which are associated with other system componentry as noted above by virture of the stacker crane.

This type of and other conventional flexible manufacturing systems normally employ a single sort of machining centers, i.e., either vertical machining centers or horizontal machining centers. Since the vertical machining centers cannot cut a side surface of a workpiece, need exists to turn the workpiece 90 degrees to make its side surface face upwards, each time an attempt is made to cut the side surface in the vertical machining center. This would require cumbersome and time-consuming manual workpiece set-up operation. Such drawback holds true in case of the horizontal machining centers which are able to cut the side surface only.

In view of the foregoing, it would be highly desirable and even necessary to employ a horizontal machining center in combination with a vertical machining center to thereby enhance the machining efficiency of workpieces. Despite such desirability and demand, the combined use of the vertical machining center and the horizontal one is heavily restrained mainly because the vertical machining center makes use of a vertical pallet that has no compatibility with a horizontal pallet employed in the horizontal machining center. As used herein, the term "vertical pallet" refers to a pallet specially designed for use with the vertical machining center, while the term "horizontal pallet" is intended to mean a pallet particularly adapted for use with the horizontal machining center.

In case where the vertical and the horizontal machining centers are used combiningly in a single flexible manufacturing system in spite of the incompatibility of their pallets, the workpiece on the vertical pallet ought to be unclamped and then manually relocated on the horizontal pallet prior to being fed to the horizontal machining center, and vice versa. This might hamper full automatization of the flexible manufacturing system, thus greatly reducing their productivity or yield rate and making the manufacturing process less economical.

SUMMARY OF THE INVENTION

Accordingly, it is an object of the invention to provide a vertical machining center which can be used in combination with a horizontal machining center in a single flexible manufacturing system, thus enabling the system to be maximized in its workpiece cutting ability.

Another object of the invention is to provide a vertical pallet that has compatibility with a horizontal pallet, allowing the combined use of a vertical machining center with a horizontal machining center in a single flexible manufacturing system.

According to one aspect of the invention, there will be provided a vertical machining center capable of receiving a horizontal pallet in a flexible manufacturing system, comprising: a pallet changer; a vertical pallet changeably placed on the pallet changer, the vertical pallet comprising a pallet base with a cylinder recess, a piston extendibly fitted to the cylinder recess for movement between an extended position and a retracted position, the piston provided with a piston section slidingly received in the cylinder recess to divide the cylinder recess into first and second pressure chambers and a rod section extending outwards from the cylinder recess, and a pallet saddle mounted to the rod section of the piston for removably holding a horizontal pallet; a fluid pump discharging and feeding pressurized working fluid into the respective one of the first and second pressure chambers; a fluid reservoir storing the working fluid recovered from the first and second pressure chambers; and a fluid coupler for coupling the pump and the reservoir to the first and the second pressure chambers while the vertical pallet remains placed on the pallet changer.

According to another aspect of the invention, there will be provided a vertical pallet for use in a vertical machining center to releasably clamp a horizontal pallet thereon, comprising: a pallet base with a cylinder recess; a pallet saddle provided above the pallet base and removably holding the horizontal pallet therealong, the pallet saddle movable between an up position wherein the horizontal pallet remains unclamped and a down position wherein the horizontal pallet is clamped against the pallet base; and a piston extendibly fitted to the pallet base for movement together with the pallet saddle between an extended position corresponding to the up position of the pallet saddle and a retracted position corresponding to the down position of the pallet saddle.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
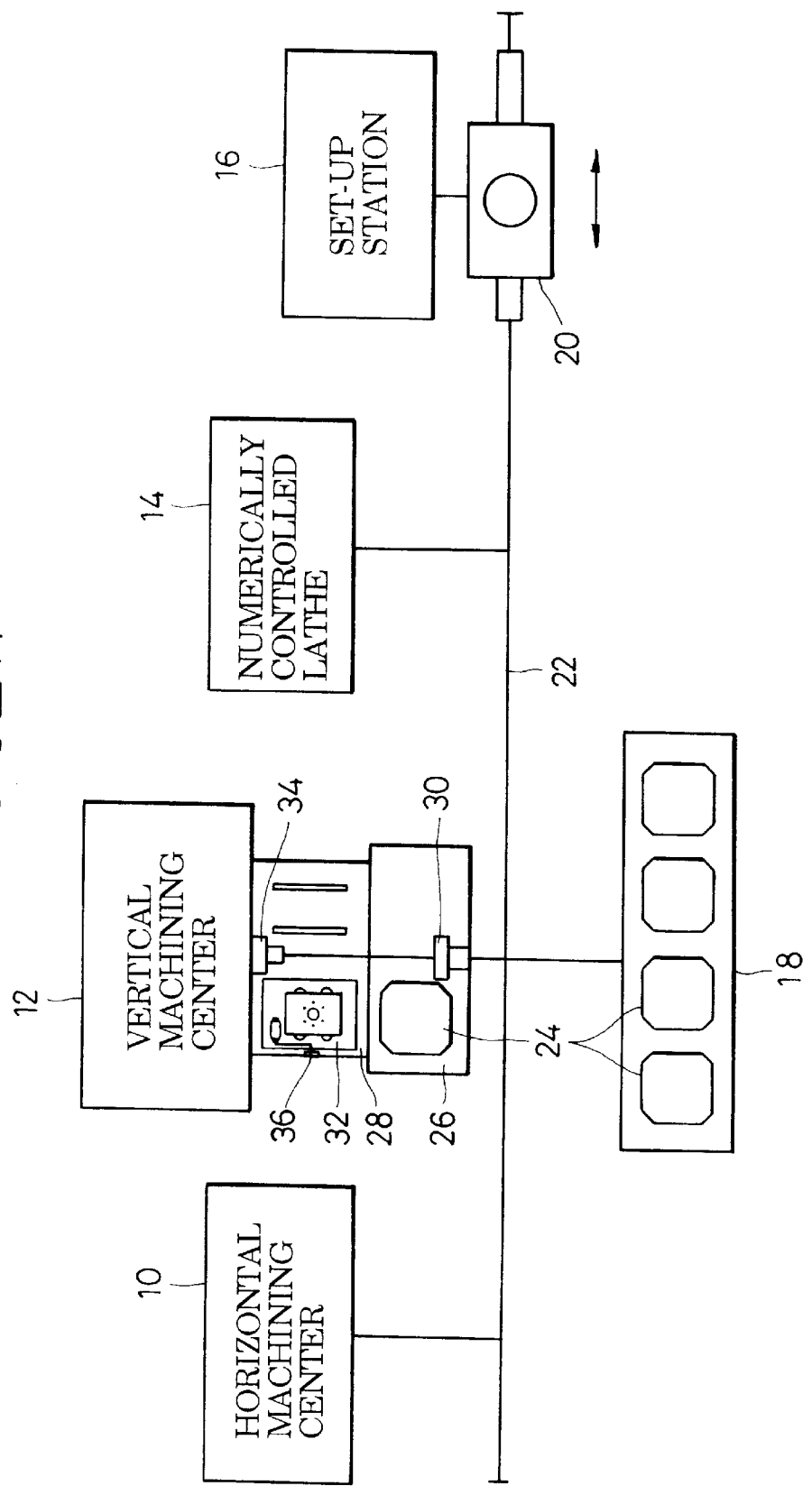
FIG. 1 is a schematic view showing a flexible manufacturing system wherein a vertical machining center of the invention is used in combination with a horizontal machining center.

Referring first to FIG. 1, there is schematically shown a flexible manufacturing system useful in cutting metal workpieces into a final or semi-final product of desired size and geometry. The system may include, but is not limited to, a horizontal machining center 10, a vertical machining center 12, a numerically controlled lathe 14, a set-up station 16 and a pallet stacker 18, all but the vertical machining center 12 of which are highly conventional in the art. A stacker crane 20 is movable along a rail 22 to transport horizontal pallets to a designated location under the control of a system controller not shown in the drawings.

In operation, the stacker crane 20 brings an empty horizontal pallet 24 to the set-up station 16 where a workpiece and one or more cutting tools are loaded onto the horizontal pallet 24. The loaded horizontal pallet 24 is then transferred to the respective one of the horizontal machining center 10, the vertical machining center 12 and the numerically controlled lathe 14 in the sequence designated by the system controller. The horizontal machining center 10 serves to machine flank sides of the workpiece loaded on the horizontal pallet, whereas the vertical machining center 12 is particularly adapted to machine the top of the workpiece. The workpiece 24 is rotated and shaped by a fixed tool in the numerically controlled lathe 14.

It is to be noted that the vertical machining center 12 includes a buffer 26 where the horizontal pallet 24 waits for a while prior to being pushed into a pallet changer 28 by a push-pull arm 30 or being picked up by the stacker crane 20. The pallet changer 28 is adapted to support a vertical pallet 32 and to change the vertical pallet 32 with the one received in a cutting room of the vertical machining center 12, In the illustrated embodiment, most part of the pallet changing operation is carried out by means of a push-pull type changer arm 34. Alongside the vertical pallet 32, an automatic fluid coupler 36 is mounted on the pallet changer 28 for such a purpose and use as fully described later.

Figure 2:
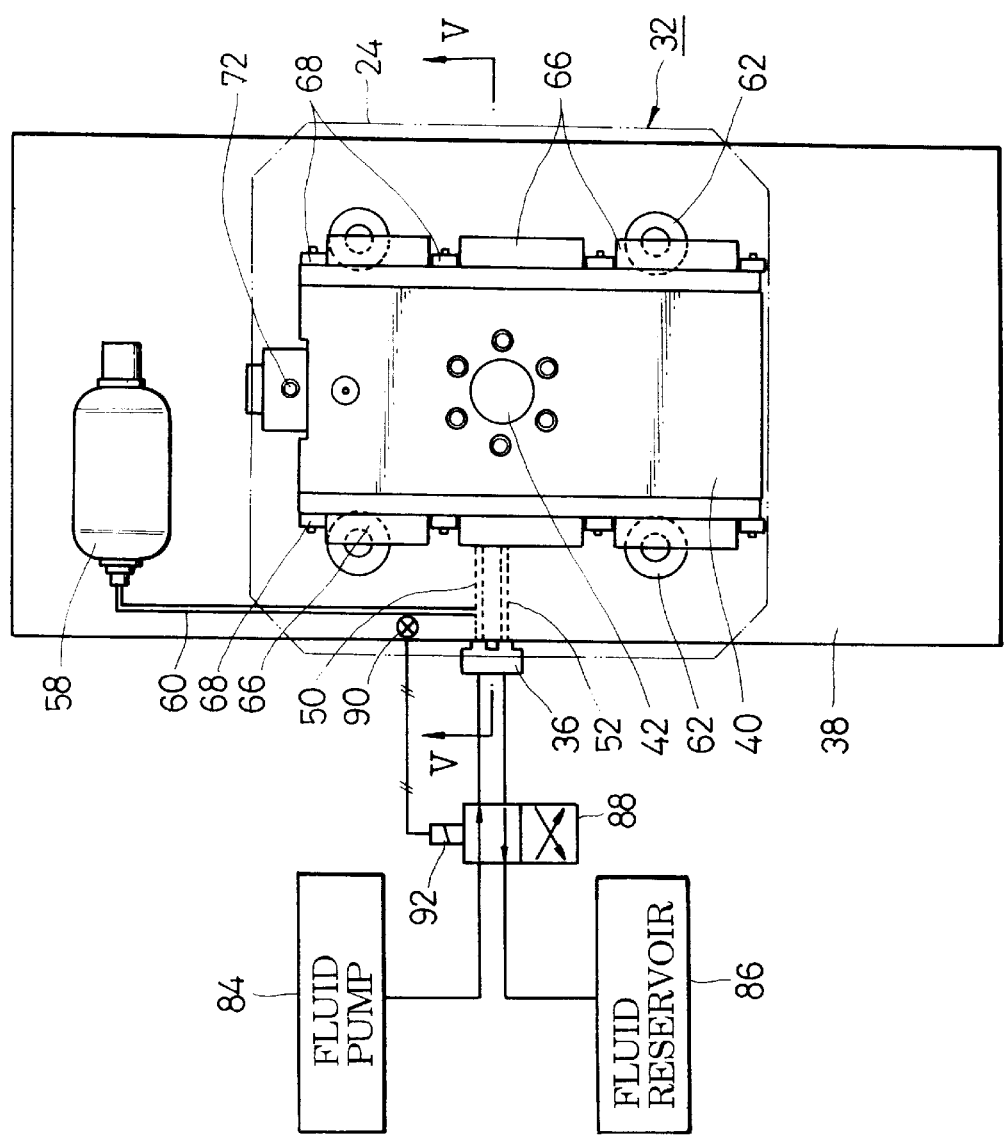
FIG. 2 is a top view of a vertical pallet and other associated componentry mounted on the vertical machining center to clamp a horizontal pallet in a releasable manner.
Figure 3:
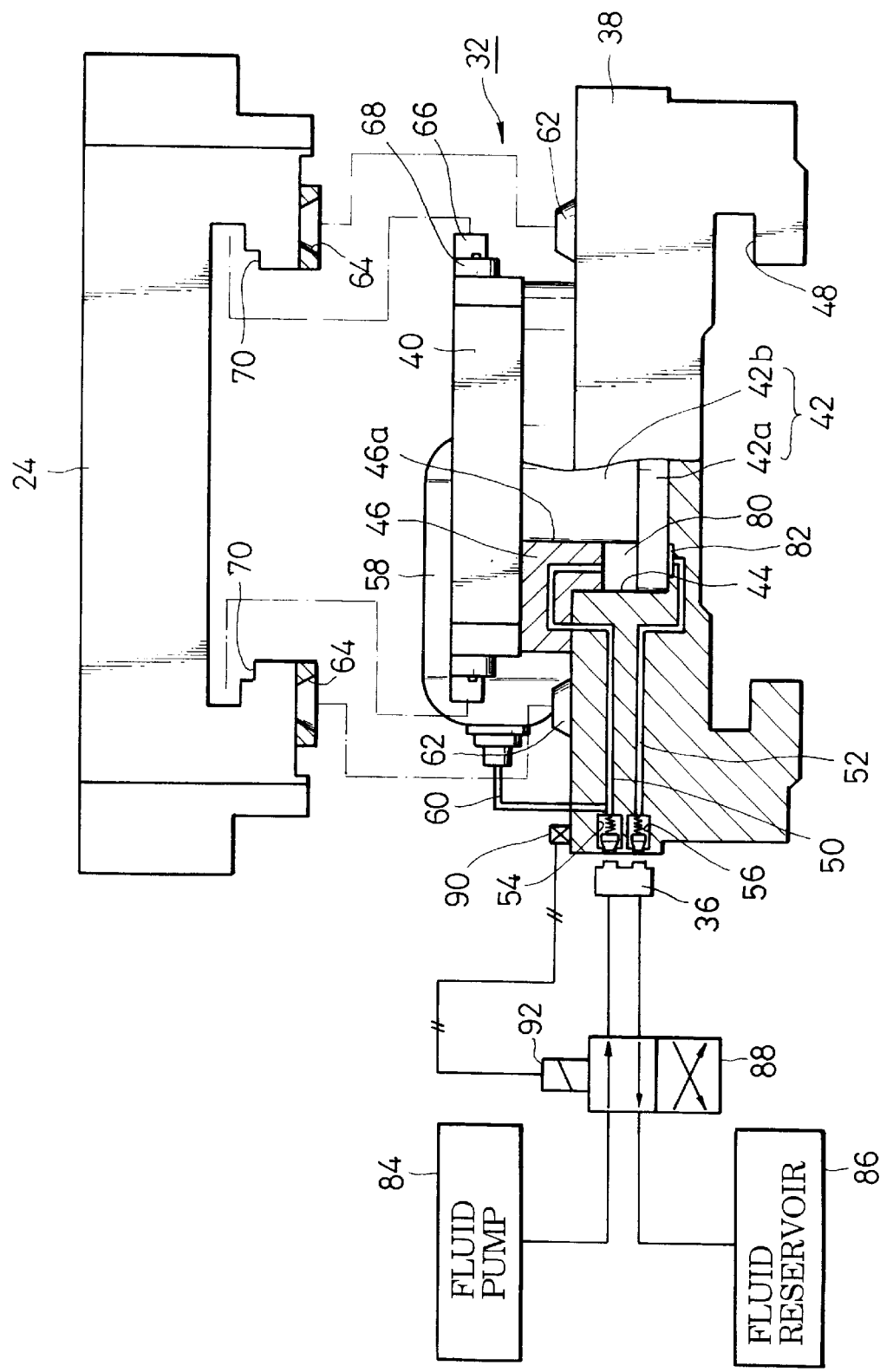
FIG. 3 is a partially cut away front view of the vertical pallet and the horizontal pallet removably held on the vertical pallet.
Figure 4:
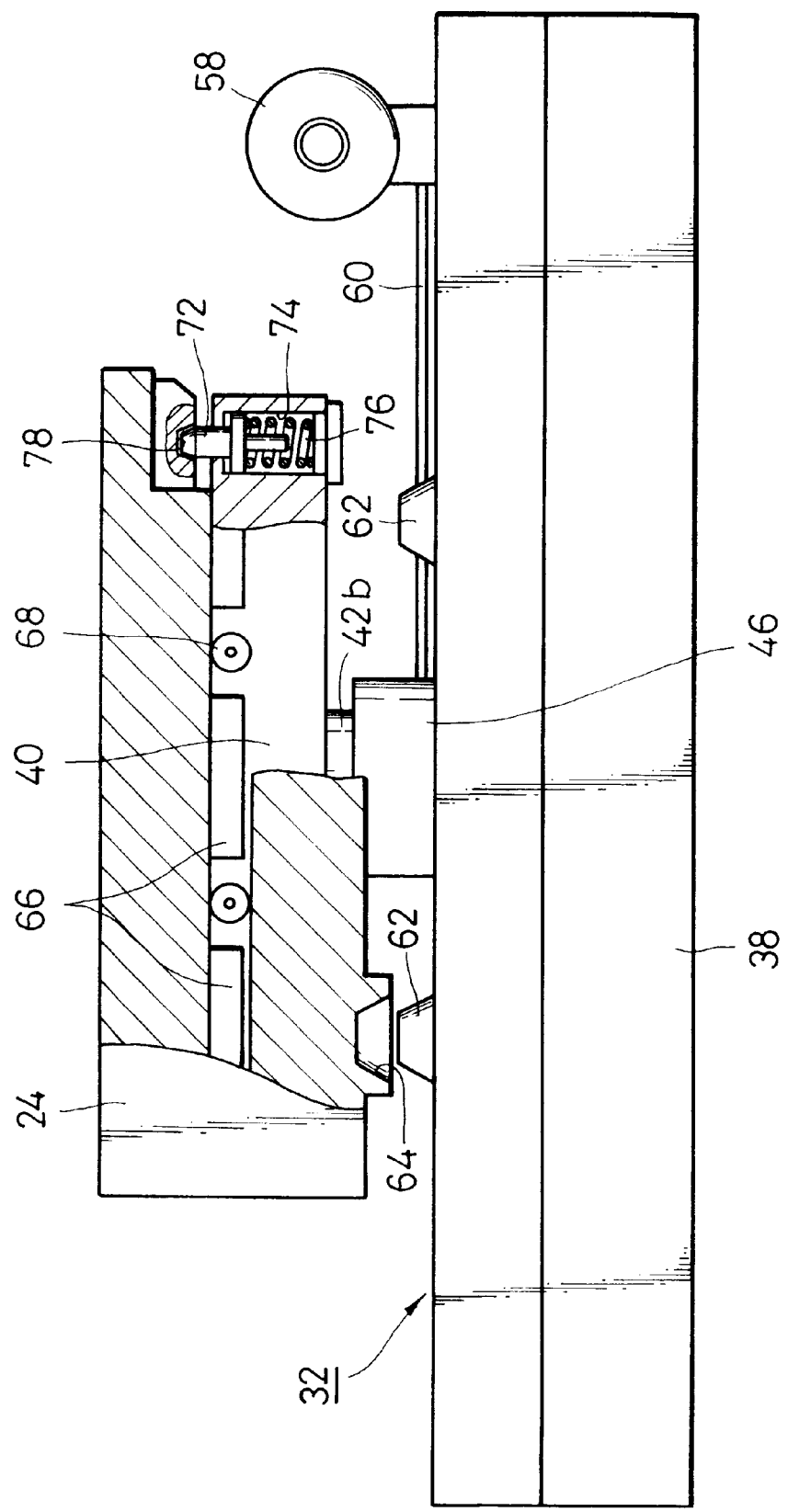
FIG. 4 is a partially cut away side view of the vertical pallet and the horizontal pallet positioned in a loading position on the vertical pallet.

Turning to FIGS. 2 through 4, it will be seen that the vertical pallet 32 is designed to removably hold and releasably clamp the horizontal pallet 24 which would be slid into the pallet changer 28 from the buffer 26. The vertical pallet 32 comprises a generally rectangular pallet base 38, a pallet saddle 40 positioned over and above the pallet base 38 to receive the horizontal pallet 24 and a piston 42 fixedly secured at its top to the pallet saddle 40 and extendibly fitted at its bottom to the pallet base 38.

As best shown in FIG. 3, the pallet base 38 has an upwardly open cylinder recess 44 which remains closed with a cover 46 having a center aperture 46a and a downwardly open guide slot 48 which would slidingly engage with a rail (not shown) of the pallet changer 28. The pallet base 38 is further provided with first and second fluid passageways 50, 52 each extending from an inlet end adjacent one flank side of the pallet base 38 up to an outlet end open into the cylinder recess 44. Provided at the inlet ends of the first and second fluid passageways 50, 52 are check valves 54, 56 that would normally close off the inlet ends against any fluid leakage and openable by the fluid coupler 36 while the vertical pallet 32 lies on the pallet changer 28 as shown in FIG. 1 only. A pressure accumulator 58 is mounted on the pallet base 38 and maintains a fluid communication with the first fluid passageway 50 via an extension pipe 60. In addition, the pallet base 38 has a plurality of, e.g., four, guide cones 62 which can engage with the complementarily shaped indentations 64 of the horizontal pallet 24.

As clearly illustrated in FIG. 2, the pallet saddle 40 is of generally rectangular configuration and is provided at its opposite sides with a plurality of spaced-apart guide flanges 66 and a plurality of guide rollers 68 alternately disposed with respect to the guide flanges 66. The guide flanges 66 and the guide rollers 68 may come into sliding engagement with the guide shot 70 (see FIG. 3) of the horizontal pallet 24 as the latter is being loaded to the vertical pallet 32.

Referring to FIG. 4, it will be appreciated that the pallet saddle 40 further has a stopper pin 72 elevationally movably received in a pin hole 74 such that the top end thereof can protrude above the pallet saddle 40 at the rear end of the saddle 40. Also received in the pin hole 74 is a compression spring 76 that would yieldably bias the stopper pin 72 upwards at all times. The stopper pin 72 may be slid into the reception hole 78 of the horizontal pallet 24 at the terminal part of the sliding movement of the horizontal pallet 24 along the pallet saddle 40, assuring that the horizontal pallet 24 should be precisely and exactly stopped at a predefined loading position on the vertical pallet 32.

With reference to FIG. 3, the piston 42 is composed of a piston section 42a slidingly received in the cylinder recess 44 and a rod section 42b extending upwards through the aperture 46a of the cover 46 to interconnect the piston section 42a to the pallet saddle 40. The piston section 42a would divide the cylinder recess 14 into first and second pressure chambers 80, 82, which remain in communication with the first and second fluid passageways 50, 52, respectively.

When the check valves 54, 56 are opened by the fluid coupler 36, the first and second pressure chambers 80, 82 may be connected to a fluid pump 84 and a fluid reservoir 86 both built in the vertical machining center 12. The fluid pump 84 is adapted to discharge and feed pressurized working fluid into the respective one of the first and second pressure chambers 80, 82, while the fluid reservoir 86 would store the working fluid recovered from the first and second pressure chambers 80, 82. A directional control valve 88 is positioned between the fluid coupler 36 and the fluid pump 84 and the fluid reservoir 86. The directional control valve 88 may be shifted between a first operative position allowing the fluid pump 84 to be in communication with the first pressure chamber 80 while the second pressure chamber 82 is connected to the fluid reservoir 86 and a second operative position permitting the fluid pump 84 to be in communication with the second pressure chamber 82 while the first pressure chamber 80 is connected to the reservoir 86.

As illustrated in FIGS. 2 and 3, a pallet sensor 90, e.g., limit switch, is attached to the pallet base 38 so as to detect the existence or absence of the horizontal pallet 24 on the vertical pallet 32. The pallet sensor 90 will issue a detection signal when the horizontal pallet 24 is placed in the loading position on the saddle 40 of the vertical pallet 32. An electromagnetic actuator 92, e.g., solenoid, may be used to control the position of the directional control valve 88. Specifically, the electromagnetic actuator 92 is activated to shift the directional control valve 88 into the first operative position in response to the detection signal generated in the pallet sensor 90. Deactivation of the electromagnetic actuator 92 would be effected by an electronic controller (not shown) built in the vertical machining center 12, so that the directional control valve 88 can be returned to the second operative position.

Figure 5:
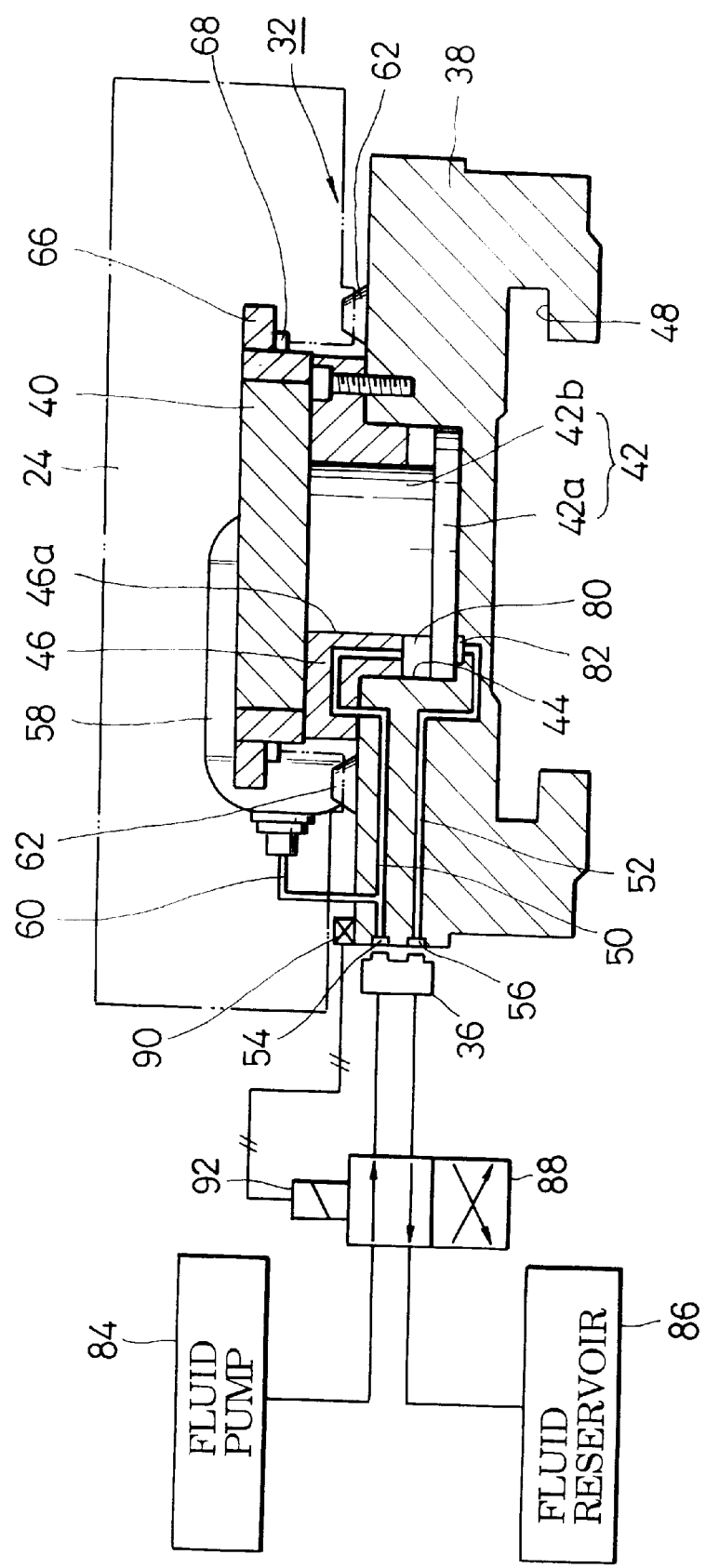
FIG. 5 is a sectional view taken along line V—V in FIG. 2, with a directional control valve assuming a first position to cause the horizontal pallet to be clamped aganist the vertical pallet.
Figure 6:
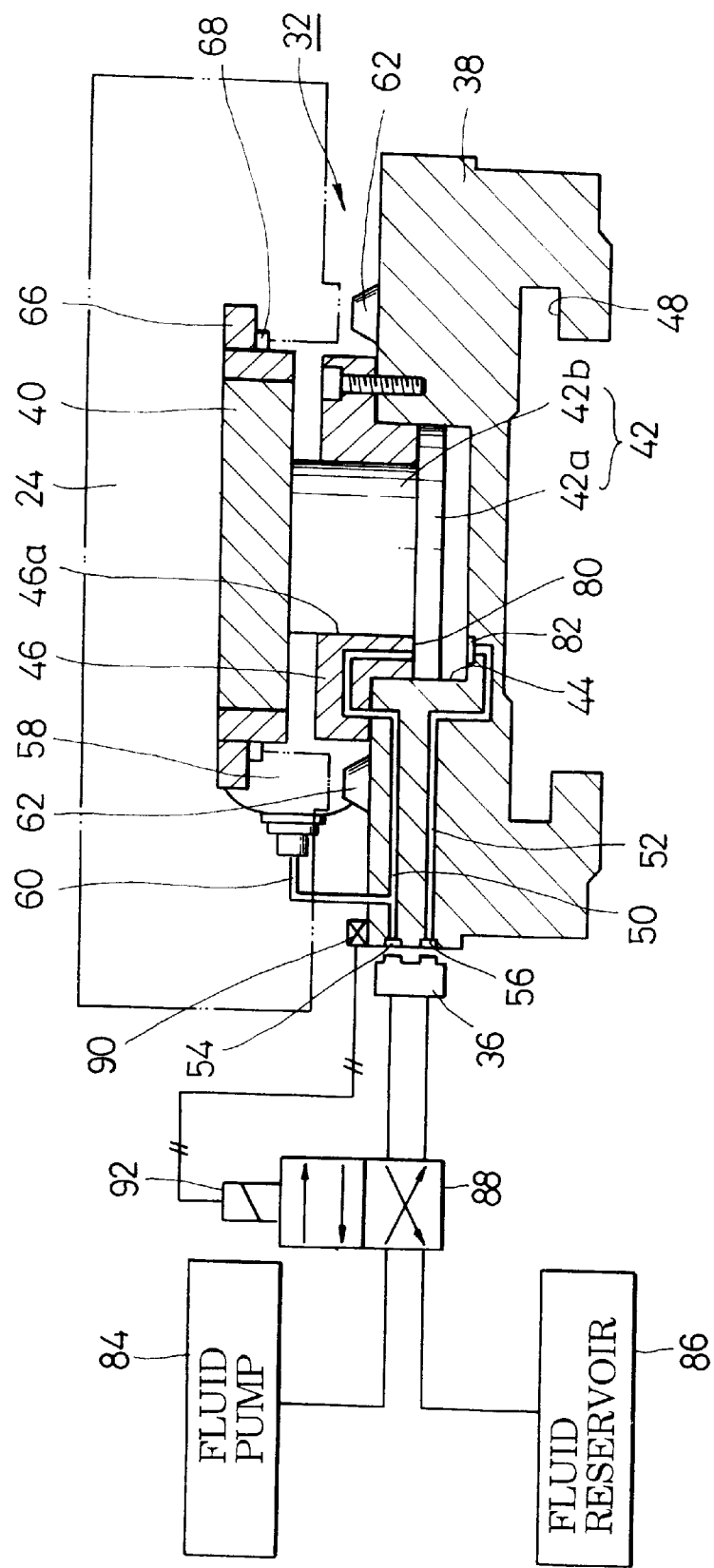
FIG. 6 is a view similar to FIG. 5 but showing the control valve shifted to a second position to allow the horizontal pallet to be unclamped.

Clamping and unclamping operation of the vertical pallet 32 will be set forth in more detail, based primarily on the illustrations in FIGS. 1, 5 and 6. When the vertical pallet 32 is placed on the pallet changer 28 of the vertical machining center 12 as in FIG. 1, the fluid coupler 36 will be automatically coupled to the first and second fluid passageways 50, 52 by way of opening the check valves 54, 56 of the pallet base 38. If, in this condition, the horizontal pallet 24 is pushed from the buffer 26 and then load to the pallet saddle 40 of the vertical pallet 32, the pallet sensor 90 will feed a detection signal to the electromagnetic actuator 92.

Responsive to the detection signal, the electromagnetic actuator 92 will shift the directional control valve 88 into the first operative position as illustrated in FIG. 5, whereby the pressurized working fluid generated in the pump 84 will be admitted into the first pressure chamber 80 via the first fluid passageway 50, with the fluid in the second pressure chamber 82 drained into the reservoir 86 via the second fluid passageway 52. This will cause retraction of the piston 42, which in turn lowers the pallet saddle 40 into the down position, making sure that the horizontal pallet 24 be clamped against the pallet base 38 as depicted in FIG. 5. At this time, the downward movement of the horizontal pallet 24 will be guided by the guide cones 62 of the vertical pallet 32.

Once the clamping operation is over, the vertical pallet 32 will be changed with the one located in the cutting compartment of the vertical machining center 12. As the vertical pallet 32 leaves the pallet changer 28 in the pallet changing procedure, the fluid coupler will be detached from the pallet base 28 of the vertical pallet 32 and, concurrently, the inlet end of the first and second fluid passageways 50, 52 will be closed off by the check valves 54, 56 to prevent leakage of the working fluid from the first pressure chamber 80 and hence to avoid unwanted extension of the piston 42. Since the vertical pallet 32 is often maintained in the cutting compartment for more than a score of hours, the fluid in the first pressure chamber 80 might be leaked gradually, thereby reducing the clamping force of the piston 42 to an unacceptable level. To preclude such instances, the pressure accumulator 58 will compensate the leaked fluid to assure that the pressure in the first pressure compartment is kept constant for an extended period of time.

When the vertical pallet 32 comes back from the cutting compartment to the initial position on the pallet changer 28, the fluid coupler 36 will be connected to the inlet ends of the first and second fluid passageways 50, 52. Then, the controller of the vertical machining center 12 will deactivate the electromagnetic actuator 92, allowing the directional control valve 88 to be shifted into the second position as shown in FIG. 6. The will cause the pressurized working fluid to be delivered from the pump 84 to the second pressure chamber 82, with the first pressure chamber 80 brought into communication with the reservoir 86. As a result, the piston 42 and the pallet saddle 40 will move upwards to unclamp the horizontal pallet 24, after which the horizontal pallet 24 is transferred to the buffer 26.

While the invention has been shown and described with reference to a preferred embodiment, it should be apparent to one of ordinary skill in the art that many changes and modifications may be made without departing from the spirit and scope of the invention as defined in the claims.

What is claimed is:

1. A vertical machining center capable of receiving a horizontal pallet in a flexible manufacturing system, comprising:

a pallet changer;

a vertical pallet changeably placed on the pallet changer, the vertical pallet comprising a pallet base with a cylinder recess, a piston extendibly fitted to the cylinder recess for movement between an extended position and a retracted position, the piston provided with a piston section slidingly received in the cylinder recess to divide the cylinder recess into first and second pressure chambers and a rod section extending outwards from the cylinder recess, and a pallet saddle mounted to the rod section of the piston for removably holding the horizontal pallet:

a fluid pump discharging and feeding pressurized working fluid into the respective one of the first and second pressure chambers;

a fluid reservoir storing the working fluid recovered from the first and second pressure chambers; and a fluid coupler for coupling the pump and the reservoir to the first and the second pressure chambers while the vertical pallet remains placed on the pallet changer.

2. The vertical machining center as recited in claim 1, further comprising a directional control valve shiftable between a first position allowing the fluid pump to be in communication with the first pressure chamber while the second pressure chamber is connected to the reservoir and a second position permitting the fluid pump to be in communication with the second pressure chamber while the first pressure chamber is connected to the reservoir.

3. The vertical machining center as recited in claim 2, further comprising a pallet sensor attached to the pallet base to generate a detection signal when the horizontal pallet is placed on the saddle of the vertical pallet and an electromagnetic valve actuator adapted to shift the directional control valve into the first position in response to the detection signal.

4. The vertical machining center as recited in claim 1, wherein the pallet base has a first fluid passageway selectively couplable to the fluid pump through the fluid coupler for directing the working fluid to the first pressure chamber and a second fluid passageway selectively couplable to the pump through the fluid coupler for introducing the working fluid into the second pressure chamber.

5. The vertical machining center as recited in claim 4, further comprising a pressure accumulator remaining coupled to the first fluid passageway for maintaining the pressure in the first pressure chamber substantially constant to keep the piston in the retracted position until the first pressure chamber is connected to the fluid reservoir.

6. The vertical pallet as recited in claim 1, further comprising a resiliently yieldable stopper pin attached to the pallet base for coming into engagement with the horizontal pallet to position the horizontal pallet in a predefined loading position along the pallet saddle.

7. The vertical pallet as recited in claim 1, wherein the pallet base is provided with a plurality of guide cones guiding the downward movement of the horizontal pallet as the piston is caused to move into the retracted position.

8. A vertical pallet for use in a vertical machining center to releasably clamp a horizontal pallet thereon, comprising:

a pallet base with a cylinder recess;

a pallet saddle provided above the pallet base and removably holding the horizontal pallet therealong, the pallet saddle movable between an up position wherein the horizontal pallet remains unclamped and a down position wherein the horizontal pallet is clamped against the pallet base; and actuator means for causing the pallet saddle to move between the up position and the down position, the actuator means comprising a piston extendibly fitted to the pallet base for movement between an extended position corresponding to the up position of the pallet saddle and a retracted position corresponding to the down position of the pallet saddle, the piston provided with a piston section slidingly received in the cylinder recess to divide the cylinder recess into first and second pressure chambers and with a rod section connecting the piston section to the pallet saddle to allow unitary movement of the piston and the pallet saddle.

9. The vertical pallet as recited in claim 8, wherein the pallet base has a first fluid passageway directing pressurized working fluid to the first pressure chamber to move down the piston into the retracted position and a second fluid passageway directing the working fluid to the second pressure chamber to move up the piston into the extended position.

10. The vertical pallet as recited in claim 9, further comprising a pressure accumulator remaining coupled to the first fluid passageway for maintaining the pressure in the first pressure chamber substantially constant to keep the piston in the retracted position.

11. The vertical pallet as recited in claim 8, further comprising a resiliently yieldable stopper pin attached to the pallet base for coming into engagement with the horizontal pallet to locate the horizontal pallet in a predefined loading position along the pallet saddle.

12. The vertical pallet as recited in claim 8, wherein the pallet base is provided with a plurality of guide cones guiding the downward movement of the horizontal pallet as the pallet saddle is caused to move into the down position.

* * * * *